Jan. 4, 1966 J. M. NISHIDA 3,227,917

CAVITY RESONATOR WITH FLEXIBLE MEANS FORMING
BOTH HERMETIC SEAL AND PIVOT POINT

Filed May 27, 1963

INVENTOR.
JERRY M. NISHIDA

BY Robert W. Dilts

ATTORNEY

United States Patent Office
3,227,917
Patented Jan. 4, 1966

3,227,917

CAVITY RESONATOR WITH FLEXIBLE MEANS FORMING BOTH HERMETIC SEAL AND PIVOT POINT

Jerry M. Nishida, San Mateo, Calif., assignor to Eitel-McCullough, Inc., San Carlos, Calif., a corporation of California Filed May 27, 1963, Ser. No. 283,158
8 Claims. (Cl. 315—5.48)

This invention relates generally to cavity resonators and more particular to a means for tuning a cavity resonator.

In many classes of high frequency electron tubes, the resonant cavity walls form a portion of the envelope. In certain types of these tubes, the cavity must be capable of being tuned over a relatively wide range of frequencies so that the tube can be adjusted to operate at various frequencies. In this type of tube, relatively complicated and expensive vacuum seals are required to permit movement of a tuning member and yet maintain a sealed envelope. Other tubes are operated at fixed frequencies and the cavity is tuned during manufacture or after installation. The cavity then remains in its fixed tuned position. For this purpose, it has been sufficient to distort the cavity moderately as by distorting the walls of the cavity. However, this requires a skilled technician or engineer in order to provide the requisite distortion of the cavity.

Many of the prior art tuned cavities utilized a bellows arrangement for maintaining a sealed envelope and still permit reciprocal movement of a tuning plunger assembly attached to one end of the bellows. However, a fixed tuned cavity without elaborate or complicated sealing techniques, which are both costly and time consuming to assemble, was sought by electron tube manufacturers. A relatively inexpensive and simply sealed tuning arrangement was required that would have sufficient flexibility to permit cavity tuning and have the adjusted tuning position fixed prior to shipment.

It is, therefore, a general object of the invention to provide an improved tunable cavity resonator and an improved means for tuning electron tubes of the cavity type.

It is a more particular object of this invention to provide a simplified tuner for resonant cavities.

It is still another object of the present invention to provide a tuner for resonant cavities of the aforementioned character which is relatively inexpensive to manufacture and easy to assemble.

It is still a further object of the present invention to provide a tuner of the aforementioned character which is adjustable to a tuned position and then fixed in this position.

Still another object of the invention is to provide a tuner of the aforementioned character which will maintain a sealed cavity envelope nad still permit a tuning element to be adjusted to a fixed tuned position.

Briefly described, the cavity resonator comprises a rigid wall cavity assembly which defines at least a portion of the cavity. An elongated element is provided having a free end within the cavity and a free end outside the cavity. Flexible means are connected to the rigid wall cavity assembly and are in engagement with the elongated element so as to permit the free end portion of the elongated element within the cavity to move in an arc towards and away from the center portion of the cavity and thereby tune the cavity. The flexible means is a diaphragm member formed in a dish shaped configuration which functions to maintain a vacuum seal in the cavity and also permits the free end of the elongated element within the cavity to move into and away from the center area of the cavity.

The tuner for the cavity resonator comprises pivot means located outside the cavity which cooperate with the elongated element and the flexible means to pivot the free end of the elongated element, within the cavity, in an arc towards and away from the center portion of the cavity and thereby tune the cavity to a desired frequency.

These and other features of the invention will become more clearly apparent upon review of the following description when taken in conjunction with the accompanying figures in which.

Figure 1:
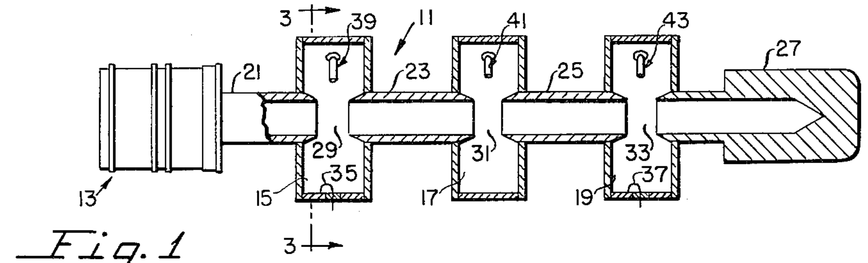
FIGURE 1 is a view partially in elevation and partially in cross-section of an electron tube of the klystron type employing an integral resonant cavity in accordance with one embodiment of this invention.

Referring to FIGURE 1, one type of electron tube to which the invention is applicable is illustrated and is a klystron tube including a gun 13, a plurality of resonant cavities 15, 17 and 19 connected by drift tube sections 21, 23 and 25 and a collector electrode 27. The drift tubes sections 21, 23 and 25 are separated by interaction gaps 29, 31 and 33 within each of the cavities 15, 17 and 19.

The gun produces a beam of electrons which is directed axially through the drift tube sections towards the collector electrode. Electron flow is accomplished by maintaining the drift tube sections and the collector electrode at a positive electrical potential with respect to the cathode of the gun 13.

The input cavity 15 may be excited by means of, for example, a loop coupler 35 to produce electromagnetic fields in the cavity which give rise to voltage variations which appear across the interaction gap 29. The velocity of the electrons crossing this gap will be modulated by the voltage fields at the gap, as is well known in the klystron art. The velocity modulation of the electron beam causes bunching of the electrons. The bunched electrons, in passing the interaction gap 31 at the cavity 17, excite this cavity which, in turn, produces electric fields at the gap which provide additional velocity modulation to further bunch the electrons in the beam.

As the bunched electron beam crosses the interaction gap 33, the cavity 19 is excited and energy is extracted by means, for example, of another induction loop 37.

The klystron, thus far described, is well known in the prior art. According to the invention, however, the various cavities 15, 17 and 19 may be tuned by means of tuning elements 39, 41 and 43 which may be identical to each other.

Figure 2:
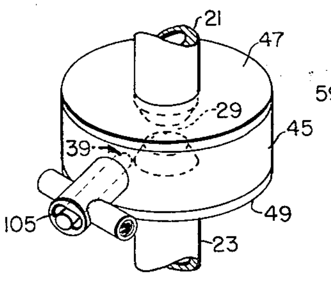
FIGURE 2 is an enlarged perspective view of a resonant cavity, such as the ones shown in FIGURE 1.
Figure 3:
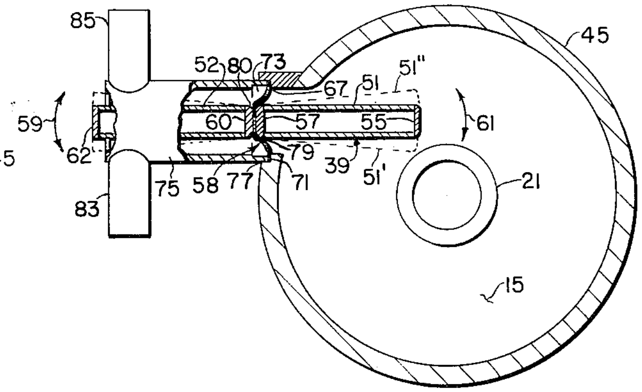
FIGURE 3 is a partial sectional view taken along the line 3—3 of FIGURE 1.

Referring particularly to FIGURES 2 and 3, a tuning means in the form of an elongated element 39, in accordance with the invention, is shown. The envelope of cavity 15 is defined by the cylindrical wall 45 sealed to side plates 47 and 49 which carry drift tubes 21 and 23 projecting inwardly into the cavity to form the interaction gap.

In FIGURE 3, the elongated element 39 has a first member 51 which is a hollow tube of metal material, such as copper. A sealing cap 55 seals a first end of the first member 51 which is the free end located within the cavity 15. The second end of the first member 51 is similarly sealed by a sealing cap 57, such as by brazing and the like. The elongated element 39 has a second member 52 which is similar to the first member 51. The second member 52 has a first end which is sealed by cap 60. A second end of the second member 52, which is the free end of the elongated element 39 located outside the cavity 15, is sealed by cap 62.

A diaphragm member 58 is connected to the cylindrical wall 45 in a manner about to be described. In order to tune the cavity 15 in accordance with the present invention, the diaphragm member 58 permits the free end portion of the elongated element 39 which is located within the cavity 15 to pivot in an arc toward and away from the center portion of the cavity 15. The pivoting or pendulum motion is shown by arrow 59 adjacent the free end portion of the elongated element 39 which extends outside of the cavity 15. Similarly, the arrow 61 within the cavity 15 indicates the motion of the free end portion of the elongated element 39 which extends within the cavity 15. The various positions of the first member 51 are represented by numerals 51′ or 51″. The change of position of the first member 51, within the cavity, varies the reactance of the cavity by changing the configuration of the electromagnetic field within the cavity and, in essence, also changes the distribution of the capacitance and inductance within the cavity to provide a different resonant frequency.

In a klystron such as illustrated, the change in frequency will be more pronounced as the first member 51 is moved closer to the interaction gap since, at this point, the highest electric and electromagnetic fields are present.

Figure 5:
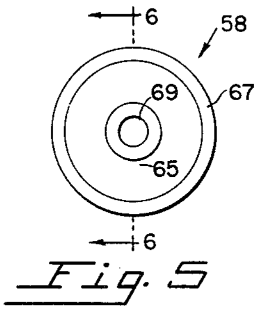
FIGURE 5 is a top perspective view of the diaphragm member shown in FIGURE 4.
Figure 6:
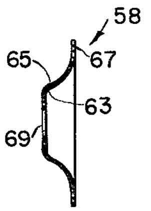
FIGURE 6 is a sectional view taken along the line 6—6 of FIGURE 5.

Referring to FIGURES 5 and 6, the diaphragm member 58 is formed in a dish shaped configuration having a concave inner surface 63 and a convex outer surface 65. A flange or rim portion 67 is formed in the diaphragm member 58 which is made of a metal material, such as Monel 403 (a nickel-copper alloy of non-magnetic permeability) and has a thickness of .007 inch. Aperture 69 is provided in the center of the diaphragm member 58, but the diaphragm member 58 can be used without an aperture as depicted in the arrangement of FIGURE 3.

Figure 4:
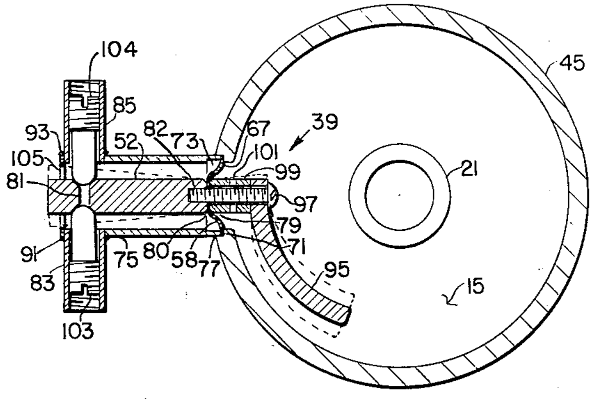
FIGURE 4 is a sectional view taken along the axis of a cavity similar to that shown in FIGURE 2 but showing another embodiment of the tuner.

Referring to FIGURES 3 and 4, the flange portion 67 of diaphragm member 58 is seated on a circumferential flange 71 formed adjacent to aperture 73 which is located in the cylindrical wall 45. In assembly, a brazing washer is provided between flanges 67 and 71 for brazing the diaphragm flange 67 to flange 71. A metal cylinder 75 having a diameter substantially the same as the diameter of aperture 73 is mounted on the flange 67 and secured to the wall 45 by a brazing operation. The brazing step can be simply performed by utilizing a brazing ring about the cylinder 75 at intersection 77 between the cylinder 75 and the wall 45.

In FIGURE 3, the first member 51 is mounted on the concave portion of the diaphragm member 58. The first member 51 is brazed to the diaphragm member 58 through use of a brazing ring at intersection 79. The second member 52 is mounted on the convex portion of the diaphragm member 58. A brazing ring at intersection 80 is used to braze the second member 52 to the diaphragm member 58.

Referring to FIGURE 4, a hole 81 is preferably countersunk through the second member 52 which is here shown as a solid metal cylinder having a shallow threaded bore 82. A pair of inwardly threaded metal cylinders 83 and 85 are mounted in cylinder 75. Cylinders 83 and 85 can be connected to cylinder 75 by a brazing operation, such as by the use of a brazing ring located about the intersections 91 and 93, respectively.

A curved copper tuning member 95 is connected by fastening means in the form of a stainless steel screw 97 to one end of a first member 99 which is a bored cylindrical member made of a metal, such as Monel 403. A hole 101 is provided in the first member 99 to facilitate pumping out of contaminants in the bore of the first member 99. In this figure, the screw 97 passes through the first member 99, the diaphragm member 58 and engages the threaded bore 82 of the second member 52.

In FIGURE 3 and as shown in detail in FIGURE 4, pivot means in the form of a pair of stainless steel screws 103 and 104 are inserted in the cylinders 83 and 85, respectively. The contact position of the screws 103 and 104 with the second member 52 can be adjusted to pivot either the first member 51 of FIGURE 3 or the curved member 95 of FIGURE 4 towards and away from the center of the cavity 15 and thereby tune the cavity 15. A metal guide member 105 is secured to the cylinder 75 and assists in guiding the free end of the second member 52.

It can be appreciated that the above-described arrangements are merely illustrations of the principles of the invention. Numerous other arrangements and modifications may be devised by one skilled in the art without departing from the spirit and scope of the invention.

What is claimed is:

1. A tunable resonant cavity having an axis comprising, in combination, a rigid wall cavity assembly defining at least a portion of the cavity, an elongated element having a free end portion within said cavity and a free end portion outside the cavity, and flexible means connected to said rigid wall cavity assembly and in engagement with said elongated element intermediate the ends thereof, and pivot means outside the cavity in engagement with said free end portion of said elongated element to permit the free end portion of the elongated element within the cavity to move in an arc towards and away from the said axis in a plane normal to the axis of the cavity and thereby tune the cavity, said flexible means forming a hermetic seal between said rigid wall cavity assembly and said elongated element, and said flexible means forming the pivot point for said arcuate movement.

2. A tunable resonant cavity in accordance with claim 1, in which the flexible means is a diaphragm member formed of a nickel-copper alloy.

3. A tunable resonant cavity in accordance with claim 1, in which a curved tuning member is secured to the free end portion of the elongated element located within the cavity.

4. A tunable resonant cavity in accordance with claim 1, in which said flexible means is fixed slightly outside the cavity area defined by the rigid wall cavity assembly.

5. A tunable resonant cavity in accordance with claim 1, in which said flexible means is a diaphragm member formed in a dish shaped configuration having a flanged rim portion, said flanged rim portion being connected to said rigid wall cavity assembly.

6. A tunable resonant cavity in accordance with claim 5, in which the inner concave surface of the dish shaped configuration portion of said diaphragm member faces the cavity area, said dish shaped configuration portion of the diaphragm member being provided with an aperture, the elongated element comprises a first member mounted on the inner concave surface of the dish shaped configuration portion of said diaphragm member, a second member mounted on the outer convex surface of the dish shaped configuration portion of said diaphragm member, and fastening means connecting the first and second members of the elongated element through the aperture in the diaphragm member.

7. A tuner in accordance with claim 1, in which the elongated element comprises a first member having said free end portion of the elongated member within the cavity at a first end and a second end in engagement with said flexible means, a second member having a first end in engagement with said flexible means and a second end comprising said free end of the elongated element outside of the cavity, said pivot means being in engagement with the elongated element in the vicinity of the second end of the second member.

8. An electron tube comprising, in combination, means for projecting a beam of charged particles, means for intercepting the beam, and beam interaction means interposed between the beam projecting and interception means for interaction with the beam, said beam interaction means comprising a resonant cavity having an axis and having a rigid wall cavity assembly defining at least a portion of the cavity, an elongated element having one free end portion within said cavity and a free end portion outside the cavity, and flexible means connected to said rigid wall cavity assembly and in engagement with said elongated element intermediate the ends thereof, and pivot means outside the cavity in engagement with said free end portion of said elongated element to permit the free end portion of the elongated element within the cavity to move in an arc towards and away from the said axis in a plane normal to the axis of the cavity and thereby tune the cavity, said flexible means forming a hermetic seal between said rigid wall cavity assembly and said elongated element, and said flexible means forming the pivot point for said arcuate movement.

References Cited by the Examiner

UNITED STATES PATENTS

| | | | |
|---|---|---|---|
| 2,323,729 | 7/1943 | Ryan | 333—83 |
| 2,323,735 | 7/1943 | Tawney | 315—5.47 X |
| 2,486,129 | 10/1949 | DeWalt et al. | 333—83 |
| 2,875,369 | 2/1959 | Chambers | 315—5.46 |
| 2,910,659 | 10/1959 | Caroselli | 333—83 X |
| 3,121,205 | 2/1964 | Foss | 333—83 |

FOREIGN PATENTS

| | | |
|---|---|---|
| 55,646 | 5/1952 | France. |

HERMAN KARL SAALBACH, *Primary Examiner.*

ELI LIEBERMAN, *Examiner.*